Patented May 23, 1939

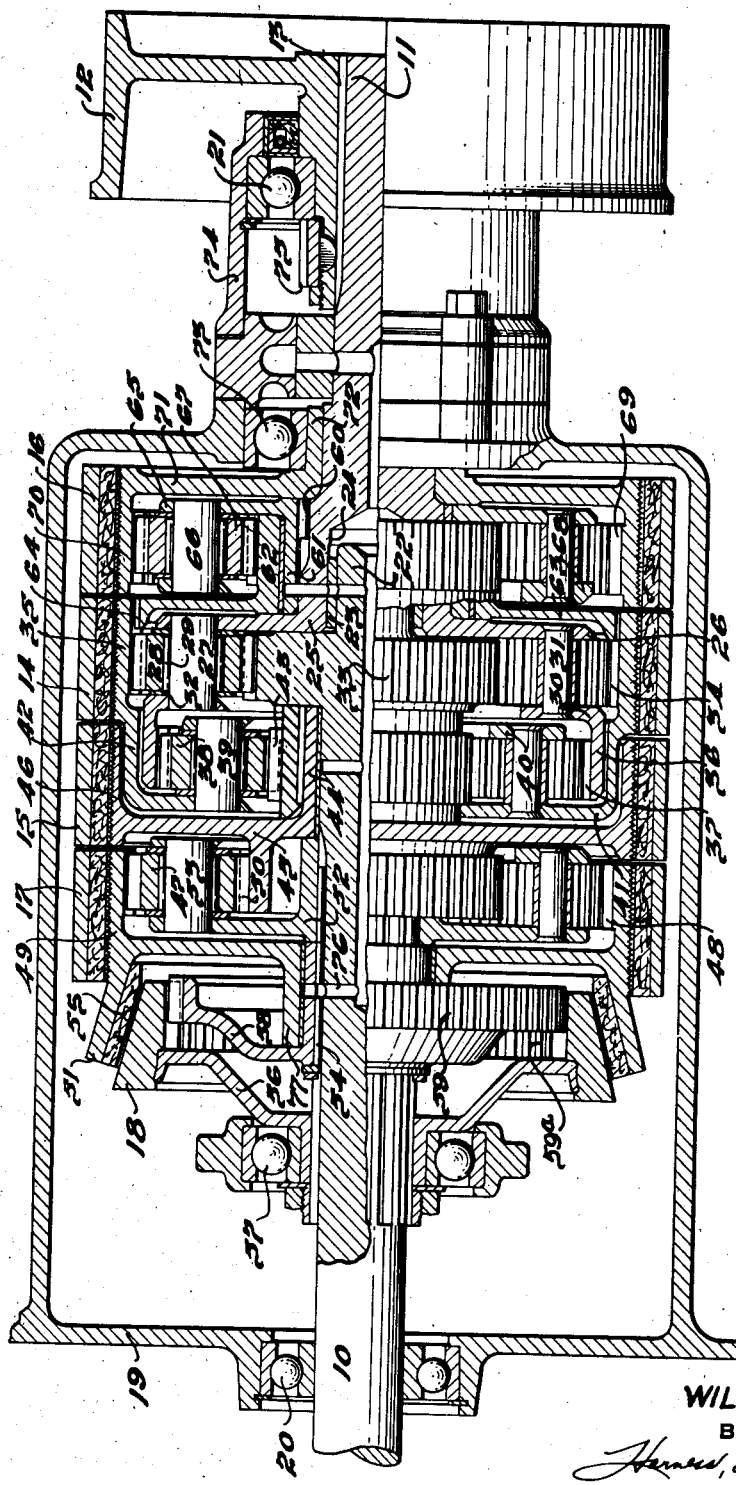

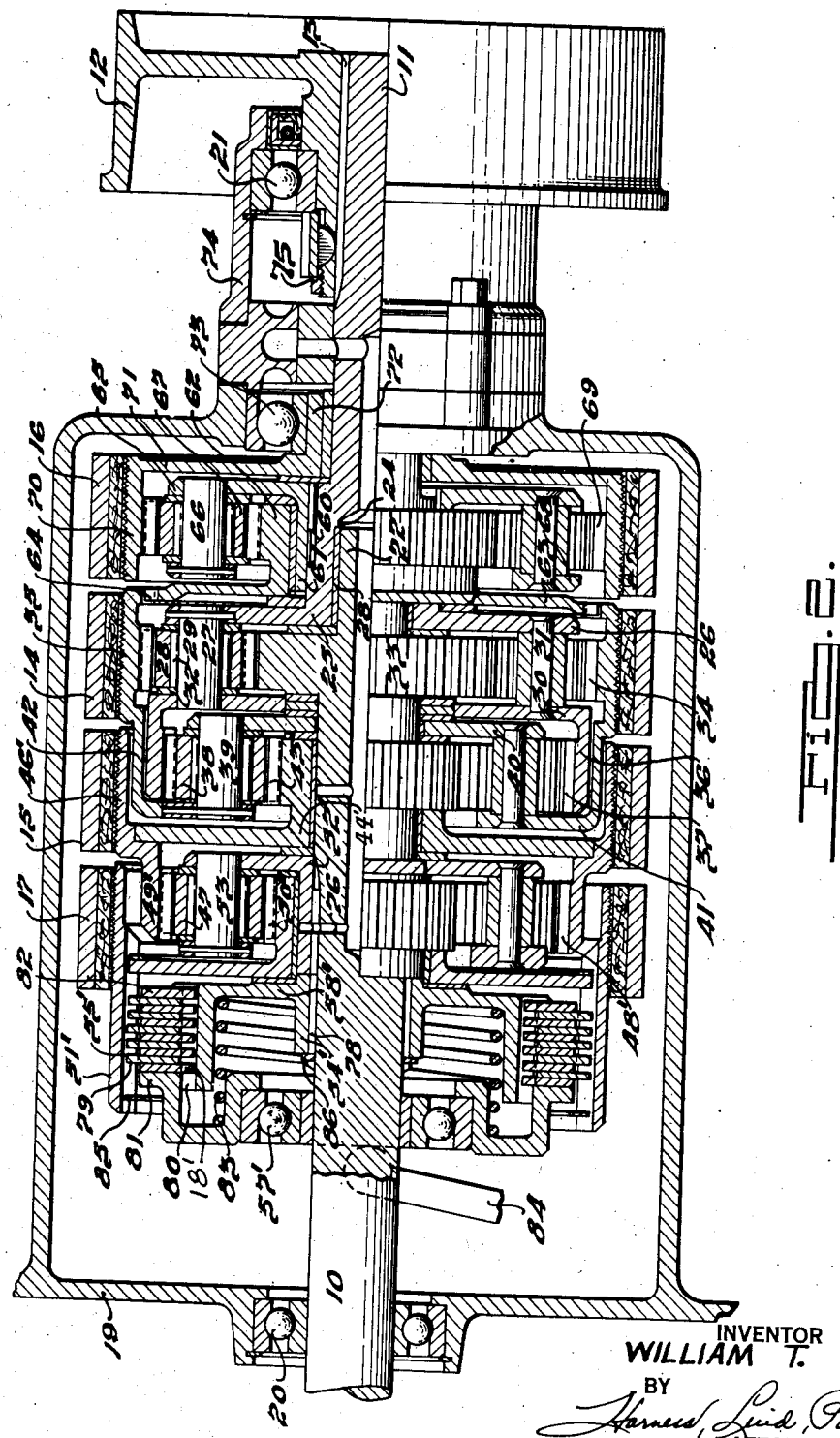

2,159,427

UNITED STATES PATENT OFFICE 2,159,427

POWER TRANSMISSION

William T. Dunn, Detroit, Mich., assignor to Chrysler Corporation, Highland Park, Mich., a corporation of Delaware Application March 30, 1936, Serial No. 71,596

22 Claims. (Cl. 74—268)

This invention relates to power transmission and refers more particularly to speed ratio changing devices adapted for use in motor vehicle drives.

More particularly, the invention has reference to the addition of an overdrive gear set to a change speed gear comprising a number of planetary gear trains of such type as is described and claimed in the co-pending joint application of Vidmar B. Stromquist and William T. Dunn, Serial No. 17,158, filed April 19, 1935.

My invention has among its objects the provision of an improved overdrive ratio of the planetary gear type.

Another object of my invention resides in the provision of an overdriving mechanism occupying a relatively small space and being simple in construction, quiet in operation, and capable of manufacture at relatively small cost. Thus, according to one aspect of my invention, I have provided an improved form and arrangement of overdriving mechanism embodying one or more sets of planetary gears in combination with a change speed gear comprising a number of planetary gear trains.

A further feature of my invention in one embodiment thereof resides in the provision of an overdrive in a planetary gearing giving a wide range of auxiliary driving ratios without increasing the sizes of the planetary gears undesirably. Thus, I have provided a planetary gear overdrive, the annulus of the overdrive train being held. In another embodiment of my invention, I have illustrated another manner in which a planetary gear overdrive may be provided, the sun gear of the overdrive train being held.

Further objects of my invention reside in the provision of an improved driving mechanism and in the novel combination and arrangement of parts thereof more particularly hereinafter described and shown in several detailed embodiments in order to illustrate the principles of my invention, reference being had to the accompanying drawings, in which:

Fig. 1 is a sectional elevational view through the planetary gear train power transmission in which my overdrive mechanism is incorporated.

Fig. 2 is a sectional elevational view through a modified planetary gear train power transmission in which my overdrive mechanism is incorporated.

In the drawings, I have illustrated my overdriving mechanism incorporated in a planetary gear train transmission, interposed between a driving shaft 10 and a driven shaft 11, the latter extending rearwardly to drive the rear wheels (not shown) of the motor car or vehicle in the usual well-known manner, it being understood that I have elected to show my invention in association with a motor vehicle drive, although my invention in its broader aspects is not necessarily limited thereto. If desired, shaft 11 may transmit its drive through the usual propeller shaft brake drum by connection with a flange 12 driven by splines 13 on the driven shaft 11.

The transmission may be of any suitable planetary type. For my illustration, I shall use the planetary gear train type transmission as described and claimed in the aforementioned co-pending joint application. Any well known means may be provided for selectively operating brakes 14, 15, 16, 17, and cone 18 for controlling the drive, such means not being illustrated as it is well known.

In the drawings, reference character 19 indicates the main casing for housing the working parts, the casing front and rear wall structures, respectively providing anti-friction bearings 20 and 21 for journalling the driving and driven shafts 10 and 11, respectively.

The driving shaft 10 has a rearward end 22 journalled by a bushing 23 in a forwardly opening bore 24 of the driven shaft 11, a forward end 25 of the driven shaft thus piloting the rear end of the driving shaft. The shaft end 25 terminates forwardly in a radially flanged carrier 26 for axles 27 of first or low speed planetary gears 28. According to generally customary practice, each planetary gear train includes a plurality of spaced planetary gears, preferably three in number, one of the gears 28 of the low speed train being shown in the drawings.

The axle 27 preferably journals its gear 28 by anti-friction rollers 29, a companion carrier 30 being secured to the carrier 26 at circumferentially spaced intervals by rivets 31 which mount the axles 27. Certain of the axles 27, between adjacent gears 28, may serve merely as spacers for the carriers 26 and 30, as illustrated at the bottom portion of the carriers. Bushings or washers 32 are located at opposite sides of each gear 28.

The gears 28 mesh with a primary driving sun gear 33, preferably formed as a part of shaft 10, and also with an internal gear annulus 34 carried by a low speed drum 35 which is adapted for engagement by brake 14.

The carrier 30 has a forward cylindrical flange 36 formed with an internal gear 37 meshing with planetary gears 38 of the second speed train. Axles 39 mounting the gears 38 are mounted between a rear carrier 40 and a forward carrier 41, the latter having a cylindrical flange 42 closely surrounding flange 36 and forming an extension of drum 35.

Gears 38 also engage a second speed sun gear 43 fixed to a hub 44 of a radial flange 45 which in turn has secured thereto a second speed drum 46 closely surrounding flange 42. The drum 46 is adapted for engagement by the second speed brake 15.

Gears 47 mesh with an internal gear annulus 48, carried by an overdrive speed drum 49 which is adapted for engagement by the brake 17, and a sun gear 50, said sun gear being a forward extension of the radial flange 45. Overdrive speed drum 49 has a forward extension 51 providing the direct speed drum. An overdrive speed carrier 52 carrying axles 53 is drivingly connected to shaft 10 by spline teeth 54.

The direct speed drum 51 is preferably in the form of a friction cone 55 adapted for engagement by the companion cone 18 which is slidable on shaft 10 through a hub 56. The hub 56 may be moved axially of shaft 10 by any suitable manually actuated shifting device (not shown) connected to the ring shown as surrounding a thrust bearing 57.

The cone 18 is drivingly connected to shaft 10 by reason of a hub 58 splined at 54 to said shaft and having outer teeth 59 drivingly and slidably engaging internal teeth 59ª carried by cone 18.

For obtaining a reverse drive, the shaft 11 has a toothed engagement at 60 with a sleeve 61 mounted on the shaft end 25, this sleeve journalling a sun gear 62 having a forward radial flange 63 drivingly connected to drum 35, as by a toothed connection 64. The sleeve 61 has a rear radial flange 65 providing a carrier for hubs 66 of planetary gears 67, the forward carrier comprising a ring 68.

The gears 67 mesh with sun gear 62 and also with an internal gear 69 of a reverse drum 70 adapted for engagement by a brake 16. Drum 70 has a rear flange 71 extending inwardly to its hub 72 journalled between shaft 11 and a bearing 73 carried by a casing flange 74. The usual speedometer drive gear is illustrated at 75 and shaft 11 may, if desired, carry brake drum 12. Lubrication ports 76 provide the bearings and sun gears with lubricant.

It will be noted that the parts are closely nested together against displacement, especially axially. Any well known means may be provided for selectively operating brakes 14, 15, 16, 17, and cone 18 for controlling the drive, such means not being illustrated as it is well known. Normally, as illustrated, the brakes have clearance with their associated drums. For obtaining a drive in low gear, brake 14 is actuated to arrest rotation of drum 35, all other brakes being free together with cone 18. Similarly, for second speed, brake 15 grips drum 46; for direct speed, cone 18 is moved to engage drum 51; for overdrive speed, brake 17 grips drum 49; for reverse, brake 16 grips drum 70. Only one of the brakes or cone 18 is actuated at a time into gripping engagement with its associated drum, all other parts of the mechanism running freely.

When brake 14 is actuated for low gear drive, such drive is obtained by sun gear 33 operating planet gears 28 about their axes, the internal gear 34 being fixed and carrier 26 revolving in the direction of drive shaft 10 but at a much slower speed.

When second speed is desired, brake 15 acts to hold the drum 46 and sun 43 fixed, the driving sun gear 33 acting on planetary gears 28 to drive shaft 11 by reason of the interconnection provided between carrier 41 and internal gear 34 and between carrier 30 and internal gear 37, the drum 35 being freely rotatable.

When overdrive speed is desired, brake 17 acts to hold drum 49, the drum flange 77 thereof being rotatably mounted on hub 58, the driving carrier 52 acting on sun 50 through planetary gears 47 to drive shaft 11 by reason of the interconnection provided between sun 43, planetary gears 38, internal gear 37 on annulus 36, and planetary gears 28 in the usual manner, drums 46 and 35 being freely rotatable.

When cone 18 engages the cone 51, internal gear 48 and planet carrier 52 are both driven at the speed of shaft 10, causing the first, second, and overdrive speed gear trains to rotate as a unit with shaft 10.

For reversing the drive, brake 16 engages drum 70, the sun gear 33 transmitting the drive through the reverse gear train, it being noted that planet gear carrier 65 is fixed to the driven shaft 11 while the freely rotatable drum 35 is connected to sun gear 62. Holding of the internal gear 69 produces the reverse speed ratio drive between the shafts.

It will be noted that the forward speed ratio drives are obtained by compounding the planetary gear sets. For overdrive the compounded gear trains are driven from two points at primary sun gear 33 and at carrier 52. For low, second, and reverse drives, the gear trains are driven from primary sun gear 33 alone.

It will be understood that such terms as "low", "second", "third" or "high" as applied to the speed ratios are used in a relative sense in order to indicate progressions in speed ratio values.

Referring now to Fig. 2 showing a modified form of the epicyclic gear train transmission illustrated in Fig. 1, my overdrive mechanism incorporated in Fig. 2 differs from that in Fig. 1 in that the sun gear of the overdrive train is held. In Fig. 2 I have used reference characters similar to corresponding parts of Fig. 1 and the primed reference characters indicate parts generally similar in construction and function with the unprimed characters of Fig. 1.

Gears 38 engage the second speed sun gear 43' fixed to the hub 44' of the radial flange 49' which in turn has secured thereto the second speed drum 46' closely surrounding flange 42. The drum 46' is adapted as before for engagement by a second speed brake 15.

Gears 47 mesh with the internal gear annulus 48', carried by the overdrive annulus radial flange 49' and overdrive sun gear 50' which connects overdrive speed drum 51'. The overdrive planet carrier 52' is drivingly connected to the driving shaft 10 by spline teeth 78.

The drum 51' has a forward extension providing the direct speed drum, preferably in the form of a friction clutch having the driving and driven friction plates 18' and 55' respectively. The drum 51' is formed with a plurality of longitudinally extending internal slots, one of which is illustrated at 79, adapted to slidably and drivingly receive outwardly extending projections of the plates 55', while the driving plates 18' have inwardly extending projections likewise slidably and drivingly engaging slots, one of which is illustrated at 80, formed in the driving member 58', which has a central hub 54' providing a splined driving connection at 78 with the driving shaft 10.

The clutch plates 55' and 18' are drivingly packed together by the action of a pressure plate 81 adapted to pack the plates against a rear abutment 82, a spring 83 tending to normally release the clutch, this being the condition of the parts illustrated in Fig. 2.

The pressure plate 81 is adapted for movement rearwardly to provide the clutching action by any suitable well known mechanism partially illustrated as comprising the actuating fork member 84 and the thrust bearing 57'. Forward movement of the pressure plate 81 under the action of spring 83 is limited by the stop 85 which is carried by the drum 51, the hub 54' being located against forward displacement by a similar stop ring 86 carried by driving shaft 10.

When direct speed is desired, pressure plate 81 moves to drivingly pack plates 18' and 55'. Overdrive sun gear 50' and planet carrier 52' are both driven at the speed of shaft 10, causing the first, second, and overdrive speed gear trains to lock and thereby rotate as a unit with shaft 10.

When overdrive speed is desired, brake 17 acts to hold drum 51', the radial flange of said drum simultaneously holding overdrive sun gear 50' rotatably mounted on carrier 52'. The overdrive planet carrier 52' is drivingly connected to driving shaft 10 at 78. The driving carrier 52' acts on internal gear 48' of second speed drum extension 49' through planetary gears 47 to drive shaft 11 by reason of the interconnection provided between sun 43', planetary gears 38, internal gear 37 on annulus 36, and planetary gears 27—drums 46 and 35 being freely rotatable. The overdrive is thus compounded through the other forward speed gear sets.

When first, second, or reverse speeds are desired, brakes 14, 15, and 16 are actuated as previously explained in connection with the Fig. 1 embodiment.

I desire to point out that I do not limit my invention, in the broader aspects thereof, to any particular combination and arrangement of parts such as shown and described for illustrative purposes in the several embodiments hereinbefore referred to, since various modifications will be apparent from the teachings of my invention and within the scope thereof as defined in the appended claims.

What I claim is:

1. In a planetary gear transmission, a driving shaft, a driven shaft co-axially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear co-axial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to drive said driven shaft in second speed, an overdrive sun gear co-axial with said driving shaft and rotatable independently thereof, an overdrive annulus rotatable independently of said driving shaft, overdrive planetary gears drivingly engaged with said overdrive sun gear and said overdrive annulus, an overdrive carrier for said overdrive planetary gears directly drivingly connected to said drive shaft, braking means adapted to arrest rotation of said overdrive annulus gear for causing said driven shaft to rotate at a speed greater than that of the driving shaft, and direct drive clutching means for drivingly connecting said driving shaft with said overdrive annulus gear, with all the aforesaid braking means released for causing said driving shaft to drive said driven shaft at the same speed.

2. In a planetary gear transmission, a driving shaft, a driven shaft co-axially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear co-axial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to drive said driven shaft in second speed, an overdrive sun gear co-axial with said driving shaft and rotatable independently thereof, an overdrive annulus rotatable independently of said driving shaft, overdrive planetary gears drivingly engaged with said overdrive sun gear and said overdrive annulus, an overdrive carrier for said overdrive planetary gears directly drivingly connected to said drive shaft, braking means adapted to arrest rotation of said overdrive annulus gear for causing said shaft to rotate at a speed greater than that of the driving shaft, direct drive clutching means for drivingly connecting said driving shaft with said overdrive annulus gear, with all the aforesaid braking means released for causing said driving shaft to drive said driven shaft at the same speed, a reverse speed sun gear co-axial with said driven shaft and rotatable independently thereof, a reverse speed annulus, reverse speed planetary gears drivingly engaged with said reverse sun gear and reverse speed annulus, means directly drivingly connecting said low speed annulus with said reverse speed sun gear, a reverse speed carrier for said reverse speed planetary gears directly drivingly connected to said driven shaft, and braking means adapted to arrest rotation of said reverse speed annulus for causing said primary sun gear to drive said driven shaft in reverse.

3. In a planetary gear transmission, a driving shaft, a driven shaft, a plurality of forwardly driving planetary gear trains including an overdrive speed planetary gear train for drivingly connecting said shafts, a single driving sun gear carried by said driving shaft for selectively transmitting a plurality of forward drives to said driven shaft through a plurality of said gear trains, means for directly drivingly connecting said shafts including a driving clutch member, a hub connected to said driving shaft and having a sliding driving connection with said driving clutch member, means including a thrust member slidable on said driving shaft independently of said hub for moving said driving clutch member, and a driven clutch member engageable with said driving clutch member, said driven clutch member being drivingly connected to an element of said overdrive speed planetary gear train.

4. In a planetary gear transmission, driving and driven co-axially arranged shafts, a plurality of planetary gear trains including an overdrive speed planetary gear train adapted to selectively transmit forward drives between said shafts, a reversing planetary gear train intermediate shafts, and a sun gear directly drivingly connected to said driving shaft and adapted to impart drive to each of said gear trains respectively during said forward drives.

5. In a planetary gear transmission, driving and driven co-axially arranged shafts, a plurality of planetary gear trains including an overdrive speed planetary gear train adapted to selectively transmit forward drives between said shafts, a reversing planetary gear train intermediate said shafts, a sun gear directly drivingly connected to said driving shaft and adapted to impart drive to each of said gear trains respectively during said forward drives, and a plurality of co-axial control drums for each of said gear trains, said drums having substantially equal diameters and being arranged to respectively house said gear trains.

6. In a planetary transmission having a driving shaft, a plurality of groups of forwardly driving planetary gear sets including an overdrive speed planetary gear train operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, means whereby said overdrive speed resulting from the compounding of the first, second and overdrive gear groups is obtained by holding an element of the overdrive gear train, and a reverse planetary gear set mounted on said driven shaft and having the planet gear carrier thereof fixed with said driven shaft and the sun thereof fixed with the annulus of the first gear group.

7. In a planetary transmission having a driving shaft, a plurality of groups of forwardly driving planetary gear sets including an overdrive speed planetary gear train operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, and means whereby said overdrive speed resulting from the compounding of the first, second and overdrive gear groups is obtained by holding an element of the overdrive gear train.

8. In a planetary transmission having a driving shaft, a plurality of groups of forwardly driving planetary gear sets including an overdrive speed planetary gear train operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, means whereby the driven shaft may be driven faster than the driving shaft by holding the annulus of said overdrive speed planetary gear train to direct said faster drive from said overdrive speed gear train through the first and second gear groups to the driven shaft, and means for drivingly connecting the annulus of said overdrive speed planetary gear train with said driving shaft to provide a direct drive between said shafts.

9. In a planetary gear transmission, a driving shaft, a driven shaft co-axially arranged with respect to said driving shaft, a primary sun gear carried by said driving shaft, low speed planetary gears driven by said primary sun gear, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear co-axial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear for causing said primary sun gear to drive said driven shaft in second speed, an overdrive speed sun gear co-axial with said driving shaft and rotatable independently thereof, an overdrive speed annulus rotatable independently of said driving shaft, overdrive speed planetary gears drivingly engaged with said overdrive speed sun gear and said overdrive speed annulus, an overdrive speed carrier for said overdrive speed planetary gears directly drivingly connected to said driven shaft, braking means adapted to arrest rotation of said overdrive speed sun gear for causing said driving shaft to drive said driven shaft in overdrive speed, direct drive clutching means for directly drivingly connecting said driving shaft with said overdrive speed sun gear for causing said driving shaft to directly drive said driven shaft, said clutching means including a driving element drivingly connected to said driving shaft, and a plurality of driving and driven clutch plates respectively drivingly connected to said driving element and to said overdrive speed sun gear.

10. In a planetary gear transmission, a driving shaft, a driven shaft co-axially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear co-axial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to drive said driven shaft in second speed, an overdrive sun gear co-axial with said driving shaft and rotatable independently thereof, an overdrive annulus rotatable independently of said driving shaft, overdrive planetary gears drivingly engaged with said overdrive sun gear and said overdrive annulus, an overdrive carrier for said overdrive planetary gears directly drivingly connected to said drive shaft, braking means adapted to arrest rotation of said overdrive sun gear for causing said driven shaft to rotate at a speed greater than that of the driving shaft, and direct drive clutching means for drivingly connecting said driving shaft with said overdrive sun gear, with all the aforesaid braking means released for causing said driving shaft to drive said driven shaft at the same speed.

11. In a planetary transmission having a driving shaft, a plurality of groups of forwardly driving planetary gear sets including an overdrive speed planetary gear train operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, means whereby the driven shaft may be driven faster than the driving shaft by holding the sun of said overdrive speed planetary gear train to direct said faster drive from said overdrive speed gear train through the first and second gear groups to the driven shaft, and means for drivingly connecting the sun of said overdrive speed planetary gear train with said driving shaft to provide a direct drive between said shafts.

12. In a planetary transmission having a driving shaft, a plurality of groups of forwardly driving planetary gear sets including an overdrive speed planetary gear train operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, said overdrive planetary gear train including a planetary sun gear member and a planetary annulus gear member, one of said planetary gear members being drivingly connected to a gear element of said second gear group, clutching means for operably connecting the other of said planetary gear members with said driving shaft for establishing a direct drive between said driving and driven shafts, and means for holding the last said planetary gear member to provide an overdrive between said driving and driven shafts compounded through said first and second gear groups.

13. In a planetary gear transmission, driving and driven co-axially arranged shafts, a plurality of planetary gear trains adapted to selectively transmit forward drives between said shafts, an overdrive gear train operably associated with said planetary gear trains for driving the driven shaft from and faster than said driving shaft, and means for operably connecting said overdrive train with said driven shaft through said plurality of planetary gear trains.

14. In a planetary gear transmission, driving and driven co-axially arranged shafts, a plurality of planetary gear trains adapted to selectively transmit forward drives between said shafts, an overdrive planetary gear train operably associated with said planetary gear trains for driving the driven shaft from and faster than said driving shaft, and means for holding the annulus of said overdrive planetary gear train to operably connect said overdrive gear train with said driven shaft through said plurality of gear trains.

15. In a planetary gear transmission, driving and driven co-axially arranged shafts, a plurality of planetary gear trains adapted to selectively transmit forward drives between said shafts, an overdrive planetary gear train operably associated with said planetary gear trains for driving the driven shaft from and faster than said driving shaft, and means for holding the sun of said overdrive planetary gear train to operably connect said overdrive gear train with said driven shaft through said plurality of gear trains.

16. In a planetary gear transmission, driving and driven shafts, a plurality of planetary gear trains adapted to selectively transmit speed ratio drives between said shafts, an overdrive planetary gear train adapted to drive the driven shaft from and faster than said driving shaft, said overdrive gear train including a planet gear meshed with sun and annulus gears, one of said gears of the overdrive gear train having driving connection with said driving shaft and another having driving connection with an element of one of said plurality of planetary gear trains, and means for holding the third of said gears of the overdrive gear train for providing said faster drive compounded through said overdrive gear train and at least one of said plurality of planetary gear trains.

17. In a planetary transmission according to claim 16, means for clutching said driving shaft to said third gear, with said holding means released, for transmitting a direct drive between said shafts.

18. In a planetary transmission, driving and driven shafts, and a plurality of planetary gear trains for selectively transmitting speed ratio drives from said driving shaft to said driven shaft, and means including an arrangement such that one of said gear trains has a compounded drive through at least one other of said gear trains whereby to drive said driven shaft faster than said driving shaft.

19. In a planetary transmission, driving and driven shafts, a plurality of planetary gear trains for selectively transmitting speed ratio drives from said driving shaft to said driven shaft, means including an arrangement such that one of said gear trains has a compounded drive through at least one other of said gear trains whereby to drive said driven shaft faster than said driving shaft, and holding means for an element of each of said gear trains for selectively controlling said drives.

20. In a planetary transmission, driving and driven shafts, and a plurality of planetary gear trains for selectively transmitting speed ratio drives from said driving shaft to said driven shaft, a pair of said gear trains each having an element drivingly connected to one of said shafts for a compounded drive therethrough to drive said driven shaft from and faster than said driving shaft.

21. In a planetary transmission, driving and driven shafts, driving means comprising a plurality of interconnected planetary gear trains adapted to transmit variable speed ratio drives from the driving shaft to the driven shaft, means whereby one of said drives provides an overdrive, and control means operably associated with said driving means for controlling operation thereof.

22. In a planetary transmission according to claim 21, means for locking the plurality of planetary gear trains to rotate as a unit with the driving and driven shafts thereby to effect a direct drive of 1 to 1 speed ratio between the driving and driven shafts.

WILLIAM T. DUNN.